US012770033B2

(12) United States Patent
Sharma et al.

(10) Patent No.: US 12,770,033 B2
(45) Date of Patent: Oct. 20, 2026

(54) DECISION SUPPORT IN INDUSTRIAL PLANTS

(71) Applicant: ABB Schweiz AG, Baden (CH)

(72) Inventors: Divyasheel Sharma, Bangalore (IN); Benjamin Kloepper, Mannheim (DE); Marco Gaertler, Dossenheim (DE); Dawid Ziobro, Västerås (SE); Simon Linge, Västerås (SE); Pablo Rodriguez, Ilvesheim (DE); Matthias Berning, Worms (DE); Reuben Borrison, Schwetzingen (DE); Marcel Dix, Mannheim (DE); Benedikt Schmidt, Heidelberg (DE); Hadil Abukwaik, Weinheim (DE); Arzam Muzaffar Kotriwala, Ladenburg (DE); Sylvia Maczey, Hirschberg (DE); Jens Doppelhamer, Ladenburg (DE); Chandrika K R, Bangalore (IN); Gayathri Gopalakrishnan, Solna (SE)

(73) Assignee: ABB Schweiz AG, Baden (CH)

( * ) Notice: Subject to any disclaimer, the term of this patent is extended or adjusted under 35 U.S.C. 154(b) by 1131 days.

(21) Appl. No.: 17/724,693

(22) Filed: Apr. 20, 2022

(65) Prior Publication Data

US 2022/0343193 A1 Oct. 27, 2022

(30) Foreign Application Priority Data

Apr. 22, 2021 (EP) .................................... 21169991
Dec. 28, 2021 (EP) .................................... 21218027

(51) Int. Cl.
*G06N 5/04* (2023.01)

(52) U.S. Cl.
CPC ..................................... *G06N 5/04* (2013.01)

(58) Field of Classification Search
CPC ........... G06N 5/04; G05B 2219/32408; G05B 23/0275; G05B 23/0286; G05B 23/0248; G05B 23/0229; G06Q 10/063
See application file for complete search history.

(56) References Cited

U.S. PATENT DOCUMENTS 6,208,955 B1 3/2001 Provan et al.
8,332,773 B2 12/2012 Husoy et al.
(Continued)

FOREIGN PATENT DOCUMENTS

CN 109542936 A 3/2019
CN 109598346 A 4/2019
(Continued)

OTHER PUBLICATIONS

Robins, James M., Miguel Angel Hernan, and Babette Brumback. “Marginal structural models and causal inference in epidemiology.” Epidemiology 11.5 (2000): 550-560. (Year: 2000).*
(Continued)

*Primary Examiner* — Kc Chen
(74) *Attorney, Agent, or Firm* — Fitch Even Tabin & Flannery LLP

(57) ABSTRACT

A decision support system and method for an industrial plant is configured and operates to: obtain a causal graph modeling causal assumptions relating to conditional dependence between variables in the industrial plant; obtain observational data relating to operation of the industrial plant; and perform causal inference using the causal graph and the observational data to estimate at least one causal effect relevant for making decisions when operating the industrial plant.

10 Claims, 6 Drawing Sheets

(56) References Cited

U.S. PATENT DOCUMENTS

| | | | |
|---|---|---|---|
| 10,031,654 B2 | 7/2018 | Hams et al. | |
| 10,176,606 B2 | 1/2019 | Jammikunta et al. | |
| 10,235,853 B2 | 3/2019 | Kurella et al. | |
| 2005/0015217 A1 | 1/2005 | Weidl et al. | |
| 2005/0049988 A1 | 3/2005 | Dahlquist et al. | |
| 2009/0326784 A1 | 12/2009 | Tanner et al. | |
| 2013/0159240 A1 | 6/2013 | Singh et al. | |
| 2017/0220937 A1* | 8/2017 | Wada | G06F 16/2228 |
| 2019/0318256 A1 | 10/2019 | Wei et al. | |
| 2020/0005176 A1 | 1/2020 | Imazawa | |
| 2020/0073641 A1 | 3/2020 | Imazawa | |
| 2020/0134369 A1 | 4/2020 | Chopra et al. | |

FOREIGN PATENT DOCUMENTS

| | | | |
|---|---|---|---|
| CN | 111291962 | A | 6/2020 |
| DE | 10211536 | A1 | 10/2003 |
| EP | 1768005 | B1 | 11/2011 |
| JP | 2019-144779 | A | 8/2019 |
| JP | 6730340 | B2 | 7/2020 |
| KR | 10-2015-0098568 | A | 8/2015 |
| KR | 10-2080149 | B1 | 4/2020 |
| WO | WO 2016/036958 | A1 | 3/2016 |
| WO | WO 2017/087440 | A1 | 5/2017 |
| WO | WO 2019/071904 | A1 | 4/2019 |
| WO | WO 2020/010350 | A1 | 1/2020 |
| WO | WO 2020/082865 | A1 | 4/2020 |

OTHER PUBLICATIONS

Li, Jing, and Jianjun Shi. "Knowledge discovery from observational data for process control using causal Bayesian networks." IIE transactions 39.6 (2007): 681-690. (Year: 2007).*

Sharma A, Kiciman E. DoWhy: An end-to-end library for causal inference. arXiv preprint arXiv:2011.04216. Nov. 9, 2020. (Year: 2020).*

Pearl, Judea. "Causal inference in statistics: An overview." (2009): 96-146. (Year: 2009).*

Zheng et al., "Study on the Identifiability of Causal Effects in Causal Models," *Science in China* (*Series A*), 31(12): 8 pp. (Dec. 20, 2001).

The Patent Office of the People's Republic of China, Office Action in Chinese Patent Application No. 202210368989.6, 10 pp. (Jan. 26, 2025).

European Patent Office, Partial Search Report in European Patent Application No. 21169991.3, 12 pp. (Sep. 30, 2021).

Bauer et al., "A practical method for identifying the propagation path of plant-wide disturbances," *J. of Process Control*, 18(7-8): 707-719 (Aug.-Sep. 2018).

Berlet, "Konzept für ein Assistenzsystem zur Lokalisierung von Störungsursachen in Prozessanlagen mit Hilfe von objektorientierten Topologiemodellen", Master's Thesis, *Hochschule Pforzheim—Fakultät für Technik*, 126 pp. (Dec. 3, 2020).

Bloch et al., "Model-based engineering of CPPS in the process industries," *IEEE 15th International Conference on Industrial Informatics* (*INDIN*), 1153-1159 (Jul. 24-26, 2017).

Doherr et al., "Bedienbilder auf Knopfdruck," *atp edition*, 53(11): 30-39 (2011).

Github, "DoWhy," Webpage downloaded from the Internet on Jul. 13, 2022, at https://github.com/py-why/dowhy, 15 pp. (2022).

Leng et al., "Process Disturbance Cause & Effect Analysis Using Bayesian Networks," *IFAC-PapersOnLine*, 48(21): 1457-1464 (Sep. 2-4, 2015).

Schmitz et al., "Automatisierte Projektierung von HMI-Oberflachen," *VDI Berichte*, 1980: 127-138 (2007).

Thambirajah et al., "Cause-and-effect analysis in chemical processes utilizing XML, plant connectivity and quantitative process history," *Computers & Chemical Engineering*, 33(2): 503-512 (Feb. 23, 2009).

Urbas et al., "autoHMI: a model driven software engineering approach for HMIs in process industries," *IEEE International Conference on Computer Science and Automation Engineering*, vol. 3, 627-631 (Jun. 10-12, 2011).

Urbas et al., "Towards context adaptive HMIs in process industries," 9th *IEEE International Conference on Industrial Informatics*, pp. 244-249 (Jul. 26-29, 2011).

Xiang et al., "A* Lasso for Learning a Sparse Bayesian Network Structure for Continuous Variables," *NeurIPS Proceedings—Advances in neural information processing systems* 26 (*NIPS*), 9 pp. (2013).

Yang et al., "Capturing Connectivity and Causality in Complex Industrial Processes," *Springer Briefs in Applied Sciences and Technology*, 100 pp. (Apr. 2014).

Yang et al., "Progress In Root Cause and Fault Propagation Analysis of Large-Scale Industrial Processes," *J. of Control Science and Engineering*, 10 pp. (Apr. 26, 2012).

Yim et al., "Using Process Topology in Plant-Wide Control Loop Performance Assessment," *Computers & Chemical Engineering*, 31(2): 86-99 (Dec. 2006).

* cited by examiner

DECISION SUPPORT IN INDUSTRIAL PLANTS

CROSS-REFERENCE TO RELATED APPLICATIONS

This patent application claims priority to European Patent Application No. 21169991.3, filed on Apr. 22, 2021, and European Patent Application No. 21218027.7, filed on Dec. 28, 2021, each of which is incorporated herein in its entirety by reference.

FIELD OF THE DISCLOSURE

The present disclosure relates to systems and methods for decision support in industrial plants.

BACKGROUND OF THE INVENTION

Industrial plants are large and complex installations. Process control systems give operators the ability to monitor and control the process, e.g. by providing visualizations of the process and alarm management information, while process historians store the state of the system over time. Process visualizations typically depict parts of the process, often in a hierarchical way, showing e.g. dynamic process variables, trends and alarm states for a section of the process or for specific operator tasks. These process visualizations are based on engineering data and process models, and reflect e.g. the flow of information, material or energy in the process. Typically, though, the process topology information reflected in the process visualization is incomplete and fragmented, compared to the information contained in the engineering artifacts.

Monitoring the process allows the operator to diagnose abnormal situations and take corrective action. To mitigate production losses, the operator must rapidly assess the probable impact of the corrective action. However, the operator's ability to do so depends on their experience. Gaining experience in operating a specific plant often takes several years. For an inexperienced operator, it can be challenging to locate the required information in a timely manner. Obviously, experienced operators are not available in greenfield plants. Even in brownfield plants, experienced operators leave and need to be replaced. Operator training simulators (OTS) can be used to provide a head start in operations, but these are expensive owing to the requirement for a high-fidelity process model. Instead, operations with limited efficiency in the early stages of operator training are often accepted.

For these reasons, owners of industrial plants face the risk of inefficient plant operations or even major incidents due to inexperienced operators.

BRIEF SUMMARY OF THE INVENTION

There is therefore a need for affordable solutions that can support the inexperienced operator in making decisions relating to the operation of an industrial plant. This need is met by the subject-matter of the independent claims. Optional features are set forth by the dependent claims.

According to a first aspect, there is provided a decision support system for an industrial plant, the decision support system being configured to: obtain a causal graph modeling causal assumptions relating to conditional dependence between variables in the industrial plant; obtain observational data relating to operation of the industrial plant; and perform causal inference using the causal graph and the observational data to estimate at least one causal effect relevant for making decisions when operating the industrial plant.

BRIEF DESCRIPTION OF THE SEVERAL VIEWS OF THE DRAWING(S)

A detailed description will now be given, by way of example only, with reference to the accompanying drawings.

DETAILED DESCRIPTION OF THE INVENTION

Figure 1:
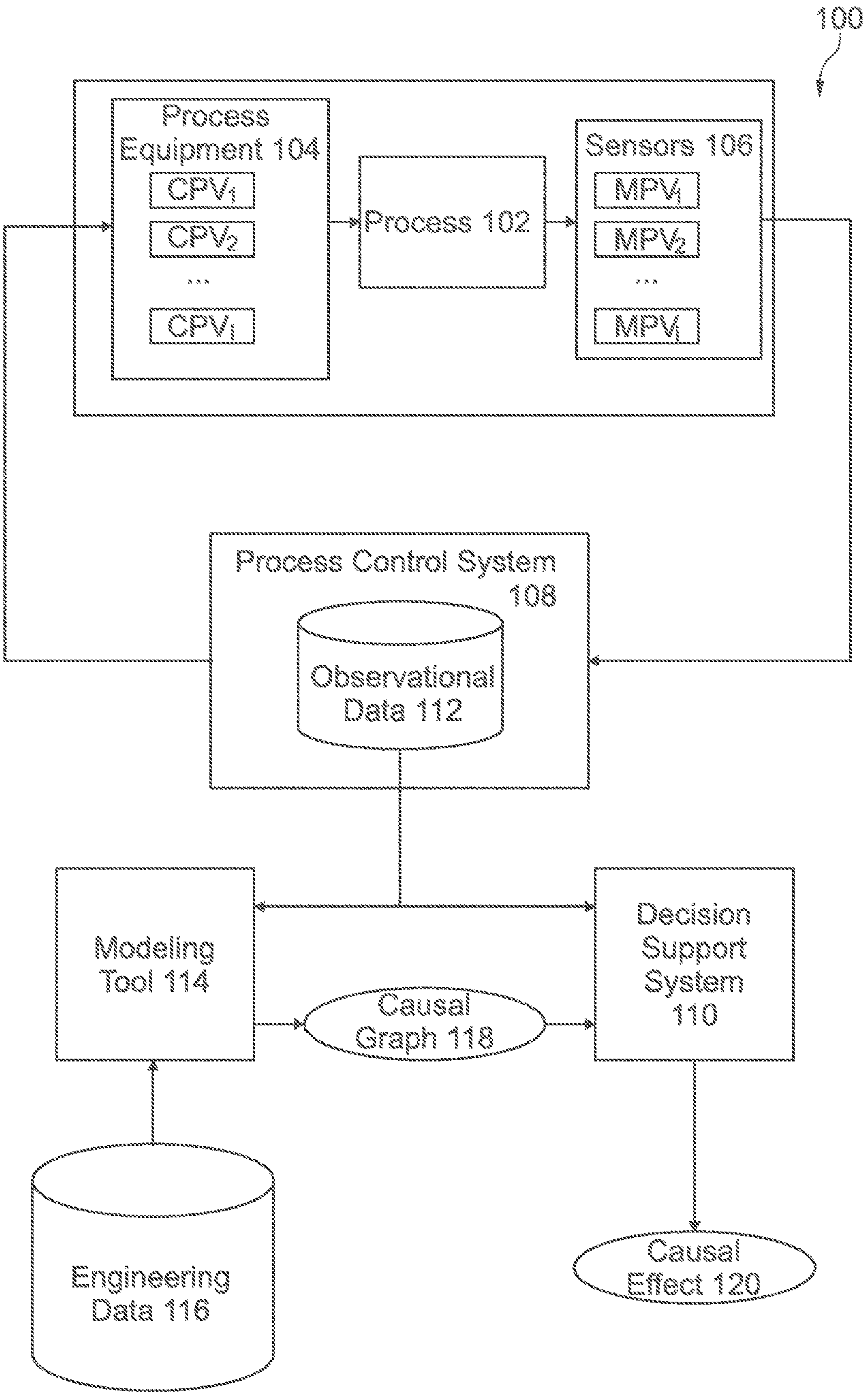
FIG. 1 illustrates an industrial plant according to the present disclosure.

FIG. 1 schematically illustrates an industrial plant 100 carrying out an industrial process 102. The process 102 is influenced by process equipment 104 (such as actuators) which receives as input control signals specifying a plurality of controlled variables (such as actuator values or setpoints) CPV1, CPV2 . . . CPVi. Sensors 106 provide feedback on the process 102 in the form of a plurality of measured variables MPV1, MPV2 . . . MPVj. Together the controlled and measured variables may be referred to as process variables PV (PV1, PV2 . . . PVn). A process control system 108 receives the feedback from the sensors 106 and outputs the control signals to the process equipment 104 so as to influence the process 102 in such a way as to produce the desired product, as is known in the art.

According to the present disclosure, the industrial plant 100 further comprises a decision support system 110 configured to: obtain a causal graph 118 modeling causal assumptions relating to conditional dependence between variables in the industrial plant 100; obtain observational data 112 relating to operation of the industrial plant 100; and perform causal inference using the causal graph 118 and the observational data 112 to estimate at least one causal effect 120 relevant for making decisions when operating the industrial plant 100. The decision support system 110 and other functional elements described herein can be implemented in computer hardware and/or software that operates to execute computer executable instructions that are provided in tangible media. Such computers can be operated on computer hardware that is co-located at a factory in which the process is running, remotely, and/or entirely or partly can be implemented using virtual servers operating in a cloud environment.

Although only one causal graph 118 is illustrated and described, several causal graphs may be used to represent the industrial process 102. The causal graphs 118 are i) provided manually by human experts, ii) automatically derived from engineering data 116 (as described further below), or any combination of the two methods. The causal graph 118 describes how the variables PV in the process 102 might influence one another. In the causal graph 118, a directed edge to a variable A from another variable B denotes that a causal relationship from B to A is expected.

Using the causal graph 118, supplemented by the observational data 112, the decision support system 110 performs causal inference to help the human operator or automated plant operation system in three use cases: (1) finding root causes; (2) finding corrective actions; and (3) what-if analysis to perform sanity checks before corrective actions are executed. Causal inference serves to ascertain whether a causal assumption is present in the observational data.

Figure 2:
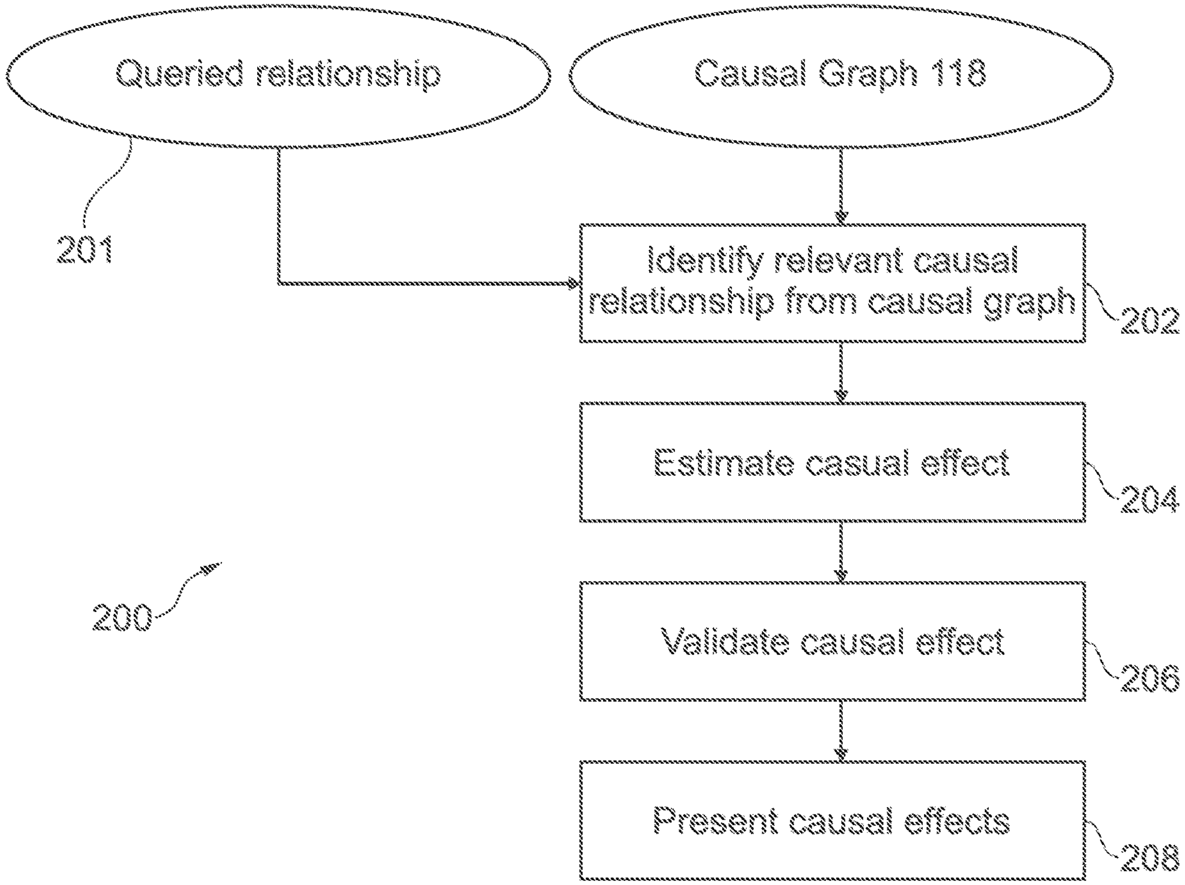
FIG. 2 is a flowchart representing a method of performing causal inference in accordance with the present disclosure.

FIG. 2 is a flowchart representing a method 200 of performing causal inference. Performing the causal inference comprises: identifying 202 the causal effect 120 based on an input query 201; estimating 204 the causal effect; optionally validating 206 the causal effect; and presenting 208 the causal effect.

In other words, in step 202 the causal graph 118 is used to decide which conditional effects (probabilistic influences) need to be taken into account when in step 204 the strength of causality is estimated. In step 206, the estimation can be tested regarding its sensitivity. At step 208, the method returns an indication as to whether variable A is actually influenced by variable B.

Starting from the causal graph 118, describing assumed causal relationships between process variables including control variables such as setpoints or actuator values, the inference requires a causal relationship to be checked. In this regard, the input query 201 is provided in the form of "Does variable B influence variable A".

After finding all possible paths from B to A in the causal graph 118 in step 202, two conditional probabilistic formulas are used in step 204 to determine whether there exists a causal relationship between A and B:

$$P1=P(A|B,\text{confounders}) \text{ and } P2=P(A|\text{confounders}),$$

where confounders are all process and controlled variables that influence both A and B. If P1 equals P2 then there is no causal relationship between A and B (every statistical relationship is explained by the confounders) and if P1 does not equal P2 there is a causal relationship. The more different P1 is to P2, the stronger the relationship. Possible methods to estimate the statistical significance of the difference between P1 and P2 are for instance propensity-based stratification, propensity score matching, inverse propensity weighting, regression, regression discontinuity.

Step 206 tests the strength and validity of the causal relationship found in the previous steps. Possible approaches are using only a subset of data to test the relationship (which should yield a similar result) or (in experimentation) using a placebo treatment (replacing data where B is present with data where B is not present).

For diagnosis and root-cause analysis, the causal graph 118 and the observational data 112 are used by the decision support system 110 to identify possible causes of an anomaly in one or several process values. For each process value, one causal graph 118 may be used. Additionally or alternatively, there may be one causal graph covering the whole process 102.

To infer possible root-causes for anomalies or undesired behavior of certain process variables PV1 . . . PVn, the causal graphs 118 for each process variable are analyzed according to the method described above in relation to FIG. 2. The input query 201 is repeated for every variable B that is not equal to A=PVi. The results of repeating the process across PV1 . . . PVn are integrated by searching for possible causes across PV1 . . . PVn to find the most likely root-cause. In addition, regression can be used to determine the direction of influence.

Moreover, topology data can be used to refine the root-cause analysis. For example, where the root-cause analysis identifies one variable (e.g. a controlled temperature) in the causal graph as a root cause, topology data may be used to identify factors contributing to that variable at an asset level going beyond the process level of the causal graph (for example the motor of a cooling unit controlling that temperature).

For identifying corrective actions, the causal graph 118 and the observational data 112 are used to identify controlled process variables that exhibit a causal relationship with a measured process variable that should be corrected.

To infer corrective actions, the process is similar to the root-cause analysis described above. The causal graphs 118 of PV1 . . . PVn that should be manipulated are analyzed (e.g. those process variables PV that were determined to be possible root-causes in the root-cause analysis). This time, not all variables B !=PVi are checked for a causal relation, but only controlled variables C that can be altered by the operator or the plant operating system (e.g. setpoint of control loops, actuator values). Again, the results across PV1 . . . PVn are integrated in order to find as few corrective actions as possible that have the desired effect. Heuristics can be used to suggest or select actions, for instance preferring setpoint changes (where a controller manages the desired effect) over direct manipulation of actuators.

For what-if analysis (identifying side effects), the same causal graph 118 and the observational data 112 that were used to infer root-causes are used. In root-cause analysis, we ask the question: was it the change observed in one variable that caused an effect in another? Whereas, in the what-if analysis, the computer program asks the question as: what if a value of one variable (i.e., a setpoint related to that variable) were changed?

When variable B influences variable A, the degree to which B influences A may be different for different values of a third variable, C. Variable B may be a controlled variable controlled using a setpoint or actuator value, or a variable influenced by such a controlled variable. In other words, changes in variable B's effect on variable A may be observed differently due to, say, different levels of valve closing. To infer what happens to variable B's effect on variable A when variable C is set to a particular value, the same causal graphs 118 and the observational data 112 are used. The causal graph 118 of the process variable A is analyzed and P(A|do (B=b), C=c) is evaluated where the value of "c" is fixed (the 'what-if value'), and B is a variable that impacts A but is invariant itself when C=c (i.e., B is not affected by C). For each causal graph 118 in which the variables are present, the input query 201 asks whether the controlled variable B has a causal relation with the dependent variable A of the causal graph 118 while C=c. The results across all graphs constitute the list of possible side effects.

The steps can be also combined in a sequential manner:—

(1) the root-cause candidate(s) for a process abnormality is determined;

(2) possible controlled variables that could address the root-cause or the symptom are identified (the process may favor such corrective actions that have a desired effect on many possible root causes);

(3) what-if analysis is performed to explain what might happen when the controlled variables are changed, and lastly, the possible side effects of actions are analyzed. Corrective actions with few side effects may be preferred. Additionally or alternatively, each dependent variable PV can be assigned a criticality so that corrective actions are preferred that have few side effects on critical process variables PV. The results of the various steps can be presented to the operator or used as candidate actions for an automated plant operation system such as a reinforcement learning based plant operating agent.

Figure 3:
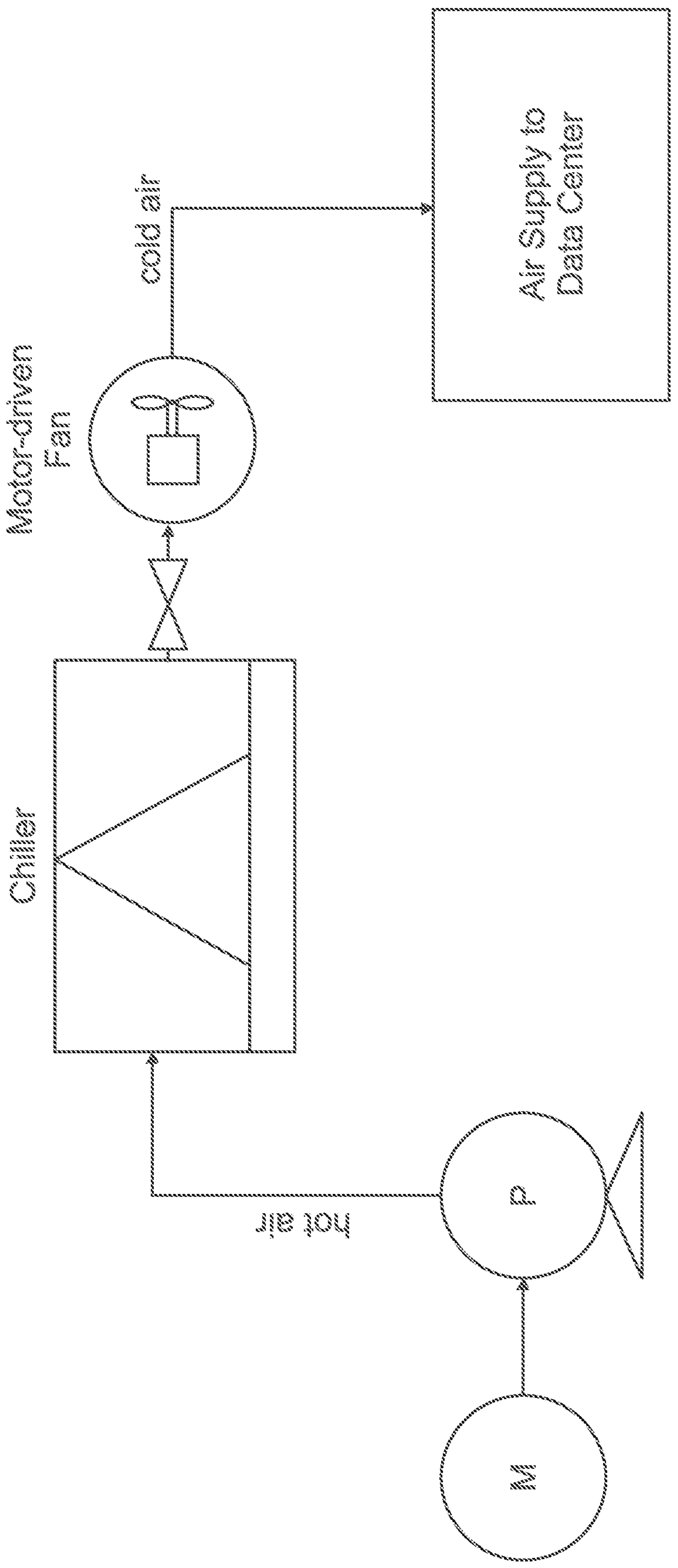
FIG. 3 illustrates a topology graph in accordance with the disclosure.
Figure 4:
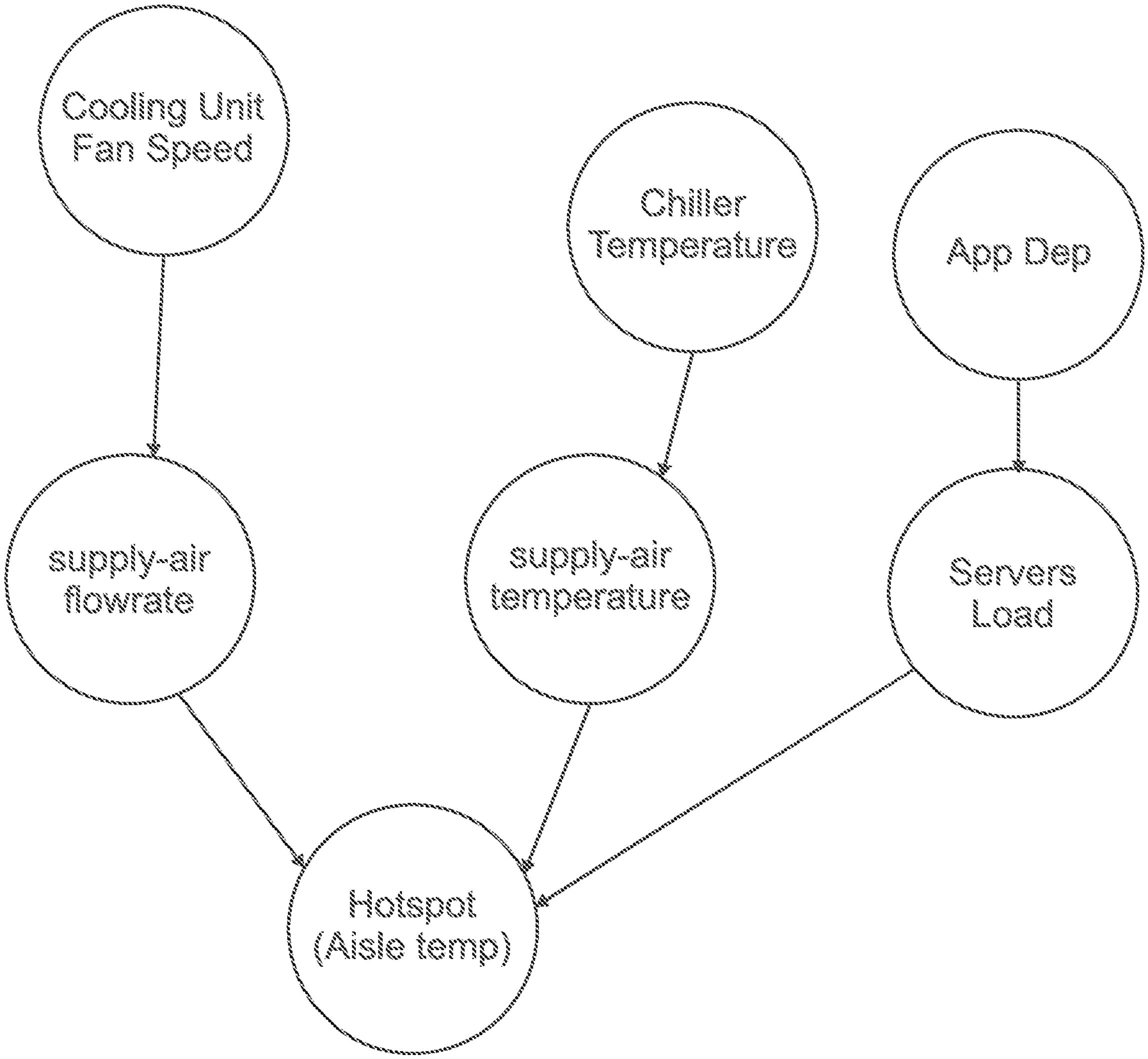
FIG. 4 illustrates a causal graph in accordance with the disclosure.

Example use cases will now be described with reference to FIG. 3, which shows a topology graph for a data center, and to FIG. 4, which illustrates a causal graph derived from the topology graph with the help of a Subject Matter Expert (SME) or learned from engineering data (e.g., by using propensity-based technique, covariate matching etc.), or using both the SME knowledge along with the engineering data. The causal graph is a directed acyclic graph comprising a set of vertices and a set of directed edges between the vertices.

The data center has a rack of servers and air conditioning units that push cold air to regulate temperature in the servers. At times, hotspots may arise in the aisles of the data center. A hotspot may be caused for various reasons. For example, a fault in the motor that powers the cooling fan that regulates the flowrate of the cold air can lead to a lack of cold air in the data center aisles and subsequently to creation of a hotspot. Or, the chiller might not be functioning properly and the supply-air temperature might not be sufficiently cold to avoid a hotspot in an aisle. Similarly, a hotspot may be created if there is overload on certain servers in an aisle due to inequitable application deployment.

In a first example use case, root-cause analysis (RCA) is performed. A hotspot is detected in the aisle temperature measured near a set of servers. An RCA input query is formulated as: does the cooling unit fan speed (variable B) influence the aisle temperature (variable A)? Since there are no confounders in this example, possible variables of interest for the root-cause analysis are:

Supply-air flow rate, cooling unit fan speed;

Supply-air temperature, chiller temperature;

Servers load, application deployment.

Given the topology graph along with the causal graph, the impacted variable's causal graph (i.e., aisle temperature's causal graph) is analyzed to perform further analysis in relation to each causal variable. Assuming for convenience that the servers load is constant, statistical estimation can be performed on the observational data for the following variables:

supply-air flow, Pr(hotspot|do(SFR=fr));

supply-air temperature, Pr(hotspot|do(SAT=t)).

The values "fr" and "t" may be selected based on operator experience and/or using values in the neighbourhoods of known setpoints, to investigate what might happen if the setpoints were altered. Ranked by the probabilities, a list of most-likely root causes is obtained indicating for example that the cooling unit fan motor might not be working properly, or the chiller may not be well regulated.

In a second example use case, corrective actions are found. The input query here may take the form: does a setpoint change for the supply-air flowrate (control variable) influence the aisle temperature (hotspot)? The probabilistic analysis procedure is similar to RCA except that for finding a corrective action only control variables are considered. Continuing with the example shown in FIGS. 3 and 4, based on the causal graph, the causal effect may be estimated as in the RCA example, and then the supply-air temperature setpoint may be reduced, or the supply-air flowrate setpoint may be increased.

In a third example use case, what-if analysis is performed to determine the degree to which the causal effect of the supply-air flowrate on the hotspot is modified by the supply-air temperature. Changes in the supply-air flowrate (SFR) are observed due to changes in the cooling unit fan speed. The causal graph is observed for the hotspot i.e., aisle temperature. Pr(hotspot|do(SFR=f), SAT=t) is then estimated for all possible supply air temperature (SAT) values. The value "f" may again correspond to a value at or around a setpoint.

Referring again to FIG. 1, also shown is a modeling tool 114 for building the causal graph 118 using the engineering data 116 and observational data 112. The causal graph 118 is then provided to the decision support system 110.

The causal graphs 118 capture the relationships between measured and controlled variables in the process 102. There might be more than one causal graph 118 to capture the process 102, e.g. one graph for each of the process variables PV (including process KPI) modelling each PV as a dependent variable. The information provided in the causal graph 118 may be qualitative (there is a relationship) rather than quantitative (how strong the relationship is and whether it is positive or negative). According to the present disclosure, graph based models are first used to select a set of relevant measurements (e.g. going from hundreds of candidates down to a few) before the above-mentioned methods are performed to refine the network structure and estimate the strength of the relationships in terms of conditional probabilities.

Figure 5:
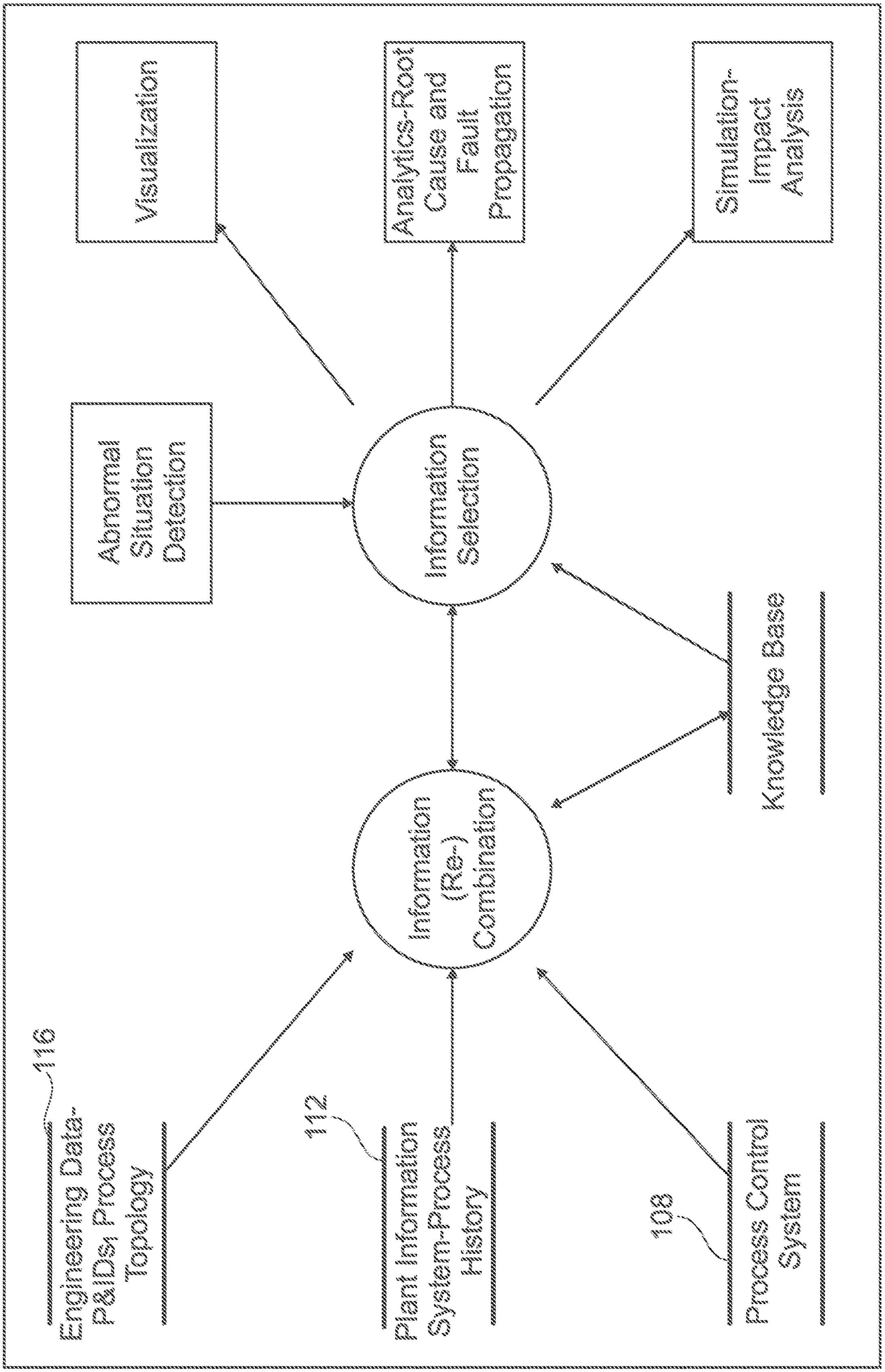
FIG. 5 illustrates a modeling method in accordance with the disclosure.

Referring now to FIG. 5, the modeling tool 114 may be configured to combine engineering data 116 e.g. plant topology and process model data with the observational data 112 from process control and monitoring. More particularly, the modeling tool 114 may combine process topology information and process control configuration with information about process state (including past and present measurements), history, and alarm and event data. In this way, dynamic information from the process control system 108 and static information about the process topology, e.g. the possible flow of information, material or energy in the process 102 may be combined. Preferably the process topology information is available in a machine-readable form that is up-to-date.

The modeling tool 114 may be configured (using e.g. programming interfaces to relevant components of the process control system 108) to:

1. find the connections between elements in the process topology. (material, energy and information flows);
2. find the connections between control system objects, e.g. control modules, I/O objects/tags, aspect objects, alarm conditions, events, historical measurements and events/timeseries and objects in the topology model using:
   a) naming conventions, e.g. tag names;
   b) information available in process control application configuration, e.g. connections between process variables, I/O points and properties in e.g. OPC DA;
   c) information available in process historian configuration;
   d) specific conventions used in control application libraries can be used (a shared knowledge base of such conventions for the control application libraries available for the plant 100 can be built up over time);
3. select relevant subsets of process variables/alarm conditions for a specific (abnormal) situation using:

a) process control system state information, e.g. a set of process variables or alarms conditions, as a starting point;
b) the process topology model, as a graph, containing topology elements (instruments, control loops, pipes, vessels etc.) and their connections (material, information, energy flow);
c) use graph analysis algorithms and heuristics that traverse the topology model based on the existence of edges being material flow or information flow among the plant elements' nodes on either a selected direction (i.e., forward or backward) or a default bi-direction. The algorithms may use a reference model that defines the types of topology nodes and edges along with the hierarchical relations of node types;

4. add historical context, e.g. event history and past process variable measurements for the selected subset of process variables/alarm conditions (this information can be ordered according to its time or frequency, e.g. the most recurring alarms of the process under investigation can be indicated using color-grade highlight or numerical weights), for example using the observational data 112;
5. use the resulting data set to create a situation specific visualization for the operator of the plant 100, in particular in the form of a causal graph with updated conditional probabilities linking the nodes in the graph that represent e.g. elements of the plant (vessels, pipes, valves, controls, instruments, etc.). Visual effects such as coloring, thickness, animation of edges and so on may be used to represent the likelihood that one variable influences another or to emphasize a link relevant with respect to a query variable (e.g. a variable that shows abnormal behavior). Example queries are described above.

The resulting causal graphs may be used as input for the above-described tool-based analysis of the plant 100, or to provide data for e.g. time-series analysis or machine learning algorithms for root cause and failure path detection. For example, causal graphs based on topology may be used to perform computational expensive analysis like transfer-entropy, or to create predictive models that determine influence in a given situation.

In this way, (qualitative) models of the process 102 may be created, without needing to rely on the expertise of an SME, that can help predict consequences of possible operator actions on relevant parts of the process 102.

The models e.g. causal graphs may be further used to parameterize and initialize (quantitative) simulation models that can offer impact calculations in the form of predictions of consequences of possible operator actions on relevant parts of the process 102. The simulation models can be used to identify possible user inputs (plant elements that have a causal influence on the abnormal situation, e.g. derived from the causal graph) that can change the current situation. The list of these input values may be used to create simulation experiments in which these values are changed in order to quantify the effect on the process state, e.g. to avoid triggering of alarm limits and system trips.

The modeling tool 114 and/or the decision support system 110 may allow user manual editing of the displayed results and offer feedback on automatic analysis of abnormal situations and their root causes. A log of the user interactions with the system can be mined for improving the performance and better meeting user expectations.

The causal graphs thus created may be used in the ways described above to identify parts of the process state relevant for a specific situation under investigation. This subset of the available process state information augmented with the relevant topology information may then be used to guide and focus the above-described tool-assisted analysis of the situation towards efficient and effective solution for root-cause problems. The parts of the process state may concern topology information and/or information such as system alarms or signals/measurements from control loops or instruments that are relevant for the specific situation. "Relevant" can be defined in that the part is linked to the situation (that is, abnormal signal shapes or alarms) with a probability above a corresponding threshold probability.

Although the decision support system 110 and modeling tool 114 are shown as separate, individual units, it will be appreciated that these systems may form part of the same unit, such as the process control system, and that these systems could be distributed systems.

Figure 6:
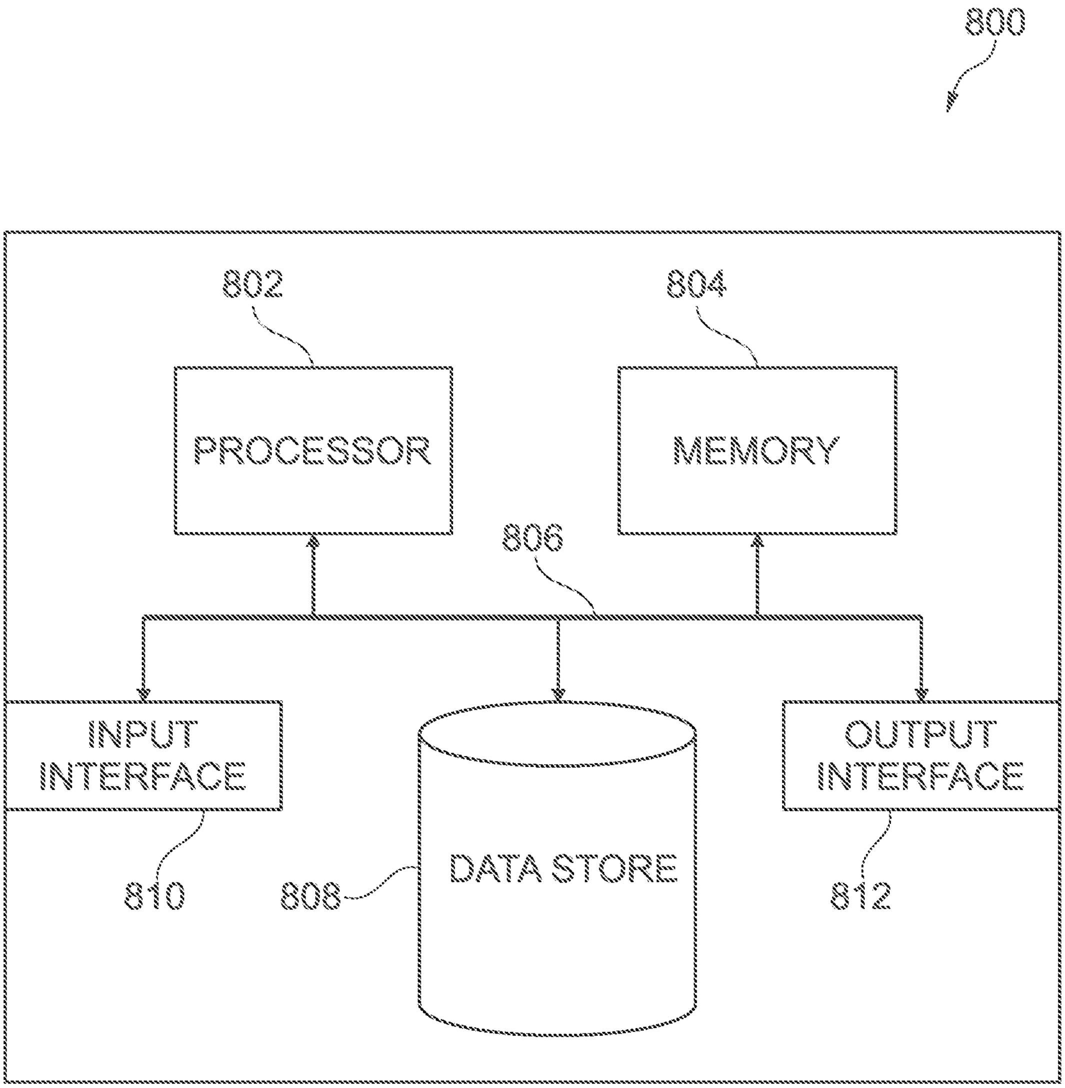
FIG. 6 illustrates a computing device that can be used in accordance with the systems and methods disclosed herein.

Referring now to FIG. 6, a high-level illustration of an exemplary computing device 800 that can be used in accordance with the systems and methodologies disclosed herein is illustrated. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

It has to be noted that embodiments of the invention are described with reference to different categories. In particular, some examples are described with reference to methods whereas others are described with reference to apparatus. However, a person skilled in the art will gather from the description that, unless otherwise notified, in addition to any combination of features belonging to one category, also any combination between features relating to different category is considered to be disclosed by this application. However, all features can be combined to provide synergetic effects that are more than the simple summation of the features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The word "comprising" does not exclude other elements or steps.

The indefinite article "a" or "an" does not exclude a plurality. In addition, the articles "a" and "an" as used herein should generally be construed to mean "one or more" unless specified otherwise or clear from the context to be directed to a singular form.

A single processor or other unit may fulfil the functions of several items recited in the claims.

The mere fact that certain measures are recited in mutually different dependent claims does not indicate that a combination of these measures cannot be used advantageously.

Any reference signs in the claims should not be construed as limiting the scope.

Unless specified otherwise, or clear from the context, the phrase "A and/or B" as used herein is intended to mean all possible permutations of one or more of the listed items. That is, the phrase "X comprises A and/or B" is satisfied by any of the following instances: X comprises A; X comprises B; or X comprises both A and B.

The present disclosure, in a general aspect, describes a system and method that provides affordable solutions that can support the inexperienced operator in making decisions relating to the operation of an industrial plant. This need is met by the subject-matter of the independent claims. Optional features are set forth by the dependent claims.

According to a first aspect, there is provided a decision support system for an industrial plant, the decision support system being configured to: obtain a causal graph modeling causal assumptions relating to conditional dependence between variables in the industrial plant; obtain observational data relating to operation of the industrial plant; and perform causal inference using the causal graph and the observational data to estimate at least one causal effect relevant for making decisions when operating the industrial plant.

In one example the causal graph is a directed acyclic graph but it will appreciated that any probabilistic graphical model may be used to represent the conditional dependence between variables. The directed acyclic graph comprises a set of vertices or nodes representing variables in the industrial plant and a set of directed edges or arrows, each edge interconnecting two vertices. Each vertex represents an independent variable or a dependent variable. By "causal assumption" is meant that a causal relationship between two variables is assumed to exist but the causal relationship is not (yet) verified by the observational data. Reference is therefore made herein to possible (i.e. assumed or putative) causal relationships, as opposed to inferred causal relationships verified by the observational data. The causal assumptions are based on domain knowledge such as engineering data relating to the industrial plant. The causal graph may be built manually by e.g. a subject matter expert (SME) or automatically by e.g. a modeling tool, such as that described herein. One or more causal graphs may be used to capture all of the dependencies between variables in the industrial plant.

The observational data relates to prior operation of the industrial plant and may comprise collected or historical measurement data (e.g. from operation and/or commissioning) such as timeseries data relating to one or more (preferably all) of the variables represented by the causal graph. The observational data may thus be viewed as non-experimental data or empirical data. While experimental data obtained using interventions or high-fidelity simulations could also be used, it will be appreciated that this is not always possible or often prohibitively expensive.

In one example performing the causal inference comprises: identifying the causal effect based on an input query; estimating the causal effect; optionally validating the causal effect; and presenting the causal effect.

Identifying the causal effect may comprise finding all possible paths between two of the variables in the causal graph. For example, the input query (or "estimand") may specify a causal relationship between the two variables for example in the form "Does variable B influence variable A?" or equivalent. In other words the query specifies one variable as an action, one variable as an outcome, and optionally one or more other variables e.g. as confounders. All possible ways in which B can have a causal effect on A are then identified. Invalid paths such as backdoor paths may be eliminated from consideration.

Estimating the causal effect may comprise using conditional probabilistic formulae to estimate the strength of the causal relationship between the two variables. For example the formulae may comprise, for the two variables A and B in the input query, $$P1=P(A|B,\text{confounders}) \text{ and } P2=P(A|\text{confounders}),$$

where a confounder is a variable (measured or controlled) in the causal graph that influences both A and B. The strength is indicated by the difference between P1 and P2. The greater the difference between P1 and P2, the stronger the causal relationship. The decision support system may be configured to use methods to estimate the statistical significance of the difference between P1 and P2, including for instance one or more of propensity-based stratification, propensity score matching, inverse propensity weighting, regression, regression discontinuity. Further estimation methods will be apparent to the person skilled in the art. Additionally or alternatively, estimating the causal effect may comprise determining that no causal relationship exists between the two variables. For example, in response to determining that P1 equals P2 (e.g. if the difference does not exceed a predetermined threshold), no causal relationship can be inferred between A and B (in other words, every statistical relationship is explained by the confounders).

Validating the causal effect may comprise performing data subset validation by re-estimating the strength of the causal relationship using only a subset of the observational data (and validating the causal effect in response to there being no significant change in the causal effect) and/or performing placebo treatment by re-estimating the strength of the causal relationship using observational data in which data including B is replaced with data in which B is not present (and validating the causal effect when the estimated strength drops to zero or thereabouts). Further validation methods will be apparent to the person skilled in the art.

Presenting the causal effect may comprise outputting the causal effect to the human plant operator for example by way of the HMI of the process control system or dashboard. Additionally or alternatively, presenting the causal effect may comprise outputting the causal effect to an entity performing automated or semi-automated operation of the industrial plant, such as an automated plant operation system, e.g. a reinforcement learning based plant operating agent.

The decision support system may be configured to perform root-cause analysis in relation to a given (measured) variable in the industrial plant to identify which of the other variables in the causal graph are most likely to influence the given variable. Root-cause analysis may be performed for the purpose of diagnosis when the given variable is found to be anomalous or to exhibit undesired behavior. The root-cause analysis may be repeated for some or all of the measured variables in the industrial plant, e.g. when anomalies are found in several measured variables.

In one example, performing the root-cause analysis for the given variable comprises: performing the causal inference to estimate the strength of the causal relationship between the given variable and each of the other variables. For example, where the industrial plant operates using process variables $PV_1$-$PV_n$, and where the given variable is $PV_i$, performing the root-cause analysis may comprise performing the causal inference as described above using a plurality of input queries each specifying the given variable as outcome variable and one of the other variables as action variable. More particularly, for each of the other variables $B=PV_1 \ldots PV_n$ not including the given variable $A=PV_i$, the input query may take the form "Does variable B influence variable A?" or equivalent. The other variables may be ranked according to the strength of the respective causal relationships with the given variable. Identifying which of the other variables in the causal graph for the given variable are most likely to influence the given variable may comprise identifying the said other variable associated with the strongest causal relationship as the most likely root cause, or alternatively returning a list of the other variables ranked by the strength of their respective causal relationships with the given variable. Variables having no or only weak causal relationships with the given variable may be excluded.

Stated another way, performing the root-cause analysis may comprise defining a problem in terms of a value of the given variable satisfying a certain condition, and performing statistical estimation to calculate, for each of the other variables, a probability of the problem occurring given the observational data for that other variable. For example, performing the root-cause analysis may comprise evaluating $P(A=a|do(B=b))$ for each of the other variables $B=PV_1 \ldots PV_n$ not including the given variable $A=PV_i$, where "a" represents the problematic condition in the given variable A. The operator "do" is known in the art for simulating an intervention by reducing the observational data to include only that portion containing the stated value. The other variables may then be identified as likely root causes of the problem and/or ranked on the basis of the respective calculated probabilities. The condition may be for example that the value lies under or over a predetermined threshold or outside a predetermined range, for example where a temperature exceeds a threshold so as to be classified as a hotspot.

The decision support system may be configured to find corrective actions capable of effecting changes in a given measured process variable, for example by using the causal graph and the observational data to identify controlled variables in the industrial plant that exhibit a causal relationship with the given variable that should be corrected.

In one example, finding corrective actions comprises: performing the causal inference to estimate the strength of the causal relationship between the given variable and each of the other variables in the causal graph that is a controlled variable. For example, where the industrial plant operates using process variables $PV_1$-$PV_n$ including at least one controlled variable C, finding corrective actions may comprise performing the causal inference as described above using for each controlled variable an input query specifying the given variable as outcome variable and the controlled variable as action variable, for example in the form "Does variable C influence variable A?" or equivalent, where C is the controlled variable C, where C !=A, and where A=$PV_i$. The controlled variables may be ranked according to the strength of the respective causal relationships with the given variable. The controlled variable associated with the strongest causal relationship may be identified for the corrective action, or alternatively a list of controlled variables may be identified optionally ranked by the strength of their respective causal relationships with the given variable. Variables having no or only weak causal relationships with the given variable may be excluded. Preferably the decision support system identifies as few corrective actions as possible that have the desired effect. The decision support system may be configured to use heuristics e.g. rule-based algorithms to select, exclude or prefer corrective actions, for example preferring setpoint changes over direct manipulation of actuators. What-if analysis may also be performed to eliminate corrective actions, as described below.

The decision support system may be configured to perform what-if analysis to identify one or more possible side effects of changing a controlled variable in the industrial plant. More particularly, performing the what-if analysis comprises: identifying in the causal graph a first variable A which is influenced by both second and third variables B and C which do not influence each other, and performing the causal inference to estimate the degree to which the causal effect of the second variable B on the first variable A is modified by the third variable C. For example, performing the what-if analysis may comprise evaluating P(A do(B=b), C=c) for all values b of B while c remains constant. Here, the what-if query is: What if the controlled variable B is set to b while the value of another variable C is c? A is the first (dependent) variable, B is the second variable, and C is the third variable. The second variable B may be a controlled variable. In this way, side effects of varying the controlled variable can be determined, i.e. a determination is made as to the effect which the second variable B has on the first variable A while the value of the third variable C was c. The process may be repeated for each causal graph in which the controlled variable is represented to list all possible side effects of modifying the controlled variable. For example, for each graph in which the controlled variable is present, the input query may relate to whether the controlled variable has a causal effect on the dependent variable(s) of the causal graph. The results across all causal graphs constitute the list of possible side effects.

The decision support system may be configured to perform combinations of root-cause analysis, finding corrective actions and what-if analysis, optionally in a sequential manner. In one example, the decision support system is configured sequentially to perform: 1) root-cause analysis to determine one or more candidate root causes for a process abnormality; 2) finding corrective actions to identify controlled variables that could address the process abnormality; 3) what-if analysis to explain what might happen when the controlled variables are changed, i.e. to analyze the possible side effects of the corrective actions. Corrective actions with few side effects may be preferred. The resulting corrective actions may be output to the operator and/or to the automated plant operation system.

According to a second aspect, there is provided a decision support method for an industrial plant, the decision support method comprising: obtaining a causal graph modeling causal assumptions relating to conditional dependence between variables in the industrial plant; receiving observational data relating to operation of the industrial plant; and performing causal inference using the causal graph and the observational data to estimate at least one causal effect relevant for making decisions when operating the industrial plant.

The decision support system and method of the first and second aspects therefore improve plant efficiency despite operator inexperience, reduce dependency on operator cognitive state, and provide for more effective handling of complicated situations and faster resolution of operational issues. The operator is assisted in drawing conclusions regarding how issues are connected regardless of the physical distance between elements in the plant topology.

Finding possible root causes of problems assists the operator in evaluating possible mitigations, i.e. reasoning about the consequences of operator actions intended to remedy the problems. The decision support system helps the operator to better analyze the problems and to find the root causes more quickly. Less time is therefore required to achieve an understanding of the root causes of the problems so that they can be addressed quickly and correctly. The decision support system assists the operator in identifying the root causes of problems that might arise in the industrial plant with respect to time and topological dependencies, e.g. anomalies in valves.

Finding corrective actions increases plant reliability via effective and efficient problem-solving of abnormal situations.

What-if analysis enables the operator to take faster and more informed decisions about corrective actions with fewer undesired side effects by explaining the context and forecasted consequences of the corrective actions.

Furthermore, the decision support system facilitates autonomous plant operation using artificial intelligence or otherwise automated plant operation systems by identifying root causes of problems and selecting corrective actions efficiently.

As mentioned above, the causal graph (or any probabilistic graph) may be modeled using domain knowledge including engineering data such as plant topology data, process model data, and control narratives.

According to a third aspect, there is therefore provided a modeling tool for building a causal graph modeling causal assumptions relating to conditional dependence between variables in an industrial plant. The modeling tool is configured to: receive engineering data relating to the industrial plant; identify a plurality of variables in the industrial plant using the engineering data; identify connections between the variables using the engineering data; and build the causal graph comprising a set of nodes representing the identified variables and a set of directed edges interconnecting the nodes, the directed edges representing causal assumptions relating to conditional dependence between the variables on the basis of the identified connections.

The engineering data may comprise process topology data, which may comprise a graph containing topology elements (instruments, control loops, pipes, vessels etc.) and their connections (material, information, energy flow). In the case that a topology graph is available, the modeling tool may be configured to use a graph analysis algorithm or heuristics to extract nodes and/or edges from the topology graph. The engineering data may further comprise one or more of: i) naming conventions e.g. tag names; ii) information available in a process control application configuration e.g. connections between process variables, I/O points and properties in e.g. OPC DA; iii) Information available in a process historian configuration. The engineering data may comprise information from process engineering, from control application engineering (including control application library building) and from the control system. The engineering data may comprise P&IDs. The engineering data may further comprises control narratives providing a textual description of the control logic, on the basis of which the causal graph may be constructed.

Variables may be identified using for example one or more of: i) process control system state information in the engineering data, e.g. a set of process variables or alarms conditions; ii) the process topology data Connections may be identified for example on the basis of material, energy and information flows identified in the engineering data. The connections may relate to connections between elements in the process topology and/or connections between control system objects, e.g. control modules, I/O objects/tags, aspect objects, alarm conditions, events historical measurements and events/timeseries and objects in the topology model.

Building the graph may further comprise using one or more propensity-based techniques and/or covariate matching techniques. Building the graph may comprise using a graph building algorithm. The algorithm may use a reference model that defines types of nodes and edges optionally along with the hierarchical relations of node types.

According to a fourth aspect, there is provided a modeling method for building a causal graph modeling causal assumptions relating to conditional dependence between variables in an industrial plant, the method comprising: receiving engineering data relating to the industrial plant; identifying a plurality of variables in the industrial plant using the engineering data; identifying connections between the variables using the engineering data; and building the causal graph comprising a set of nodes representing the identified variables and a set of directed edges interconnecting the nodes, the directed edges representing causal assumptions relating to conditional dependence between the variables on the basis of the identified connections.

Modeling the industrial plant according to the third and fourth aspects helps avoid tedious, manual selection and preparation of input from various information sources for the analysis of (abnormal) plant situations.

According to a fifth aspect, there is provided a computing device comprising a processor configured to perform the method of the second or fourth aspect.

According to a sixth aspect, there is provided a computer program product comprising instructions which, when executed by a computing device, cause the computing device to perform the method of the second or fourth aspect.

According to a seventh aspect, there is provided a computer-readable medium comprising instructions which, when executed by a computing device, cause the computing device to perform the method of the second or fourth aspect.

The invention may include one or more aspects, examples or features in isolation or combination whether or not specifically disclosed in that combination or in isolation. Any optional feature or sub-aspect of one of the above aspects applies as appropriate to any of the other aspects.

These and other aspects of the invention become apparent from and elucidated with reference to the embodiments described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A decision support system for an industrial plant, the decision support system including a controller, the controller being configured and operating to:

obtain a causal graph modeling causal assumptions relating to conditional dependence between variables in the industrial plant;

obtain observational data relating to operation of the industrial plant; and perform causal inference using the causal graph and the observational data to estimate at least one causal effect relevant for making decisions when operating the industrial plant, wherein performing the causal inference comprises:

identifying the at least one causal effect relevant for making the decisions when operating the industrial plant based on an input query;

estimating the at least one causal effect, wherein estimating the at least one causal effect comprises determining, based on the causal graph, a first conditional probability of a first variable given a second variable and at least one confounding variable, determining, based on the causal graph, a second conditional probability of the first variable given the at least one confounding variable but not the second variable, and estimating a strength of a causal relationship between the first variable and the second variable based on a difference between the first conditional probability and the second conditional probability;

validating the at least one causal effect, wherein validating the at least one causal effect comprises performing data subset validation and/or performing placebo treatment by re-estimating the strength of the causal relationship using observational data in which data including a variable is replaced with data in which the same variable is not present; and presenting the at least one causal effect.

2. The decision support system of claim 1, wherein presenting the at least one causal effect comprises outputting the at least one causal effect to a human plant operator and/or outputting the at least one causal effect to an automated plant operation system.

3. The decision support system of claim 1, further configured to perform root-cause analysis in relation to a given variable in the industrial plant to identify which of other variables in the causal graph are most likely to influence the given variable.

4. The decision support system of claim 3, wherein performing the root-cause analysis for the given variable comprises: performing the causal inference to estimate the strength of the causal relationship between the given variable and each of the other variables.

5. The decision support system of claim 1, further configured to find corrective actions capable of effecting changes in a given variable.

6. The decision support system of claim 5, wherein finding the corrective actions comprises using the causal graph and the observational data to identify controlled variables in the industrial plant that exhibit a causal relationship with the given variable.

7. The decision support system of claim 5, wherein finding corrective actions comprises: performing the causal inference to estimate the strength of the causal relationship between the given variable and each of other variables in the causal graph that is a controlled variable.

8. The decision support system of claim 1, further configured to perform what-if analysis to identify one or more possible side effects of changing a controlled variable in the industrial plant.

9. The decision support system of claim 8, wherein performing the what-if analysis comprises: identifying third and fourth variables in the causal graph which each exhibit a causal relationship with a fifth variable but not with each other, and performing the causal inference to estimate a degree to which the causal effect of the third variable on the fifth variable is modified by the fourth variable.

10. A decision support method for an industrial plant, the decision support method comprising:

obtaining a causal graph modeling causal assumptions relating to conditional dependence between variables in the industrial plant;

receiving observational data relating to operation of the industrial plant; and performing causal inference using the causal graph and the observational data to estimate at least one causal effect relevant for making decisions when operating the industrial plant, wherein performing the causal inference comprises:

identifying the at least one causal effect relevant for making the decisions when operating the industrial plant based on an input query;

estimating the at least one causal effect, wherein estimating the at least one causal effect comprises determining, based on the causal graph, a first conditional probability of a first variable given a second variable and at least one confounding variable, determining, based on the causal graph, a second conditional probability of the first variable given the at least one confounding variable but not the second variable, and estimating a strength of a causal relationship between the first variable and the second variable based on a difference between the first conditional probability and the second conditional probability;

validating the at least one causal effect, wherein validating the at least one causal effect comprises performing data subset validation and/or performing placebo treatment by re-estimating the strength of the causal relationship using observational data in which data including a variable is replaced with data in which the same variable is not present; and presenting the at least one causal effect.

* * * * *